United States Patent
Propst et al.

(10) Patent No.: US 10,455,258 B2
(45) Date of Patent: *Oct. 22, 2019

(54) VIDEO-BROADCAST SYSTEM WITH DVE-RELATED ALERT FEATURE

(71) Applicant: Tribune Broadcasting Company, LLC, Chicago, IL (US)

(72) Inventors: Scott Allan Propst, Noblesville, IN (US); Dana A. Lasher, Morgan Hill, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,862

(22) Filed: Dec. 13, 2017

(65) Prior Publication Data

US 2018/0103279 A1    Apr. 12, 2018

Related U.S. Application Data

(63) Continuation of application No. 14/864,641, filed on Sep. 24, 2015, now Pat. No. 9,883,212.

(51) Int. Cl.
*G06F 3/00* (2006.01)
*G06F 13/00* (2006.01)
(Continued)

(52) U.S. Cl.
CPC ..... *H04N 21/23424* (2013.01); *G11B 27/036* (2013.01); *G11B 27/10* (2013.01);
(Continued)

(58) Field of Classification Search
CPC .. H04N 21/278; H04N 21/232; H04N 21/251; H04N 21/25891; H04N 21/432;
(Continued)

(56) References Cited

U.S. PATENT DOCUMENTS 4,459,622 A    7/1984  Corkery
8,281,339 B1  10/2012  Walker et al.
(Continued)

FOREIGN PATENT DOCUMENTS

KR    1020090002204 A    1/2009
WO       2015035065 A1    3/2015
WO       2015126991 A1    8/2015

OTHER PUBLICATIONS

Office Action dated Jan. 19, 2018, of U.S. Appl. No. 14/864,636, filed Sep. 24, 2015.
(Continued)

*Primary Examiner* — Kyu Chae
(74) *Attorney, Agent, or Firm* — McDonnell Boehnen Hulbert & Berghoff LLP

(57) ABSTRACT

In one aspect, a method includes: receiving an instruction to apply a particular digital video-effect (DVE) of a particular DVE type to a temporal portion of a video segment based, at least in part, on the temporal portion of the video segment being suitable for having a DVE of the particular DVE type applied thereto, wherein the particular DVE corresponds to a duration; making a determination that no particular temporal portion of the video segment satisfies each condition in a set, the set comprising (i) a first condition that the particular temporal portion of the video segment has been identified as being suitable for having a DVE of the particular DVE type applied thereto, and (ii) a second condition that the particular temporal portion of the video segment is of at least the duration; and based, at least in part, on the received instruction and the determination, outputting an alert.

17 Claims, 4 Drawing Sheets

(51) Int. Cl.
  *H04N 5/445* (2011.01)
  *H04N 21/234* (2011.01)
  *G11B 27/036* (2006.01)
  *G11B 27/10* (2006.01)
  *H04N 21/2343* (2011.01)
  *H04N 21/262* (2011.01)
  *H04N 21/458* (2011.01)
  *H04N 21/81* (2011.01)
  *H04N 21/845* (2011.01)

(52) U.S. Cl.
  CPC ........... *H04N 21/234345* (2013.01); *H04N 21/26233* (2013.01); *H04N 21/26241* (2013.01); *H04N 21/458* (2013.01); *H04N 21/8126* (2013.01); *H04N 21/8456* (2013.01)

(58) Field of Classification Search
  CPC ........... H04N 21/435; H04N 21/44222; H04N 21/4622; H04N 21/4826; G06F 17/30616; G06F 17/30622; G06F 17/30675; G06F 17/3082; G06Q 30/0282
  See application file for complete search history.

(56) References Cited

U.S. PATENT DOCUMENTS

| | | | |
|---|---|---|---|
| 8,451,380 B2 | 5/2013 | Zalewski | |
| 8,752,113 B1 | 6/2014 | Good et al. | |
| 8,793,728 B1* | 7/2014 | Hundemer | H04N 21/23424 725/36 |
| 8,893,169 B2 | 11/2014 | Klappert et al. | |
| 9,049,386 B1 | 6/2015 | Hundemer | |
| 9,094,618 B1 | 7/2015 | Hundemer | |
| 9,473,801 B1 | 10/2016 | Hundemer | |
| 9,883,212 B2* | 1/2018 | Propst | H04N 21/23424 |
| 2002/0054244 A1 | 5/2002 | Holtz et al. | |
| 2002/0112249 A1 | 8/2002 | Hendricks et al. | |
| 2003/0192045 A1 | 10/2003 | Fellenstein et al. | |
| 2004/0117819 A1 | 6/2004 | Yu | |
| 2005/0253965 A1 | 11/2005 | Cooper | |
| 2006/0010465 A1 | 1/2006 | Fellenstein et al. | |
| 2008/0016114 A1* | 1/2008 | Beauregard | G11B 27/005 |
| 2008/0165388 A1 | 7/2008 | Serlet | |
| 2009/0070807 A1* | 3/2009 | Jacobs | H04H 20/103 725/36 |
| 2009/0070837 A1 | 3/2009 | Jacobs | |
| 2009/0144785 A1* | 6/2009 | Walker | G11B 27/034 725/105 |
| 2009/0144875 A1 | 6/2009 | Pearson et al. | |
| 2009/0273715 A1 | 11/2009 | Casper et al. | |
| 2009/0285551 A1* | 11/2009 | Berry | G06K 9/00711 386/249 |
| 2010/0016992 A1 | 7/2010 | Grubb et al. | |
| 2011/0173655 A1 | 7/2011 | Blumenschein et al. | |
| 2011/0289531 A1 | 11/2011 | Moonka et al. | |
| 2012/0011542 A1 | 1/2012 | Holden | |
| 2012/0185905 A1 | 7/2012 | Kelley | |
| 2013/0007815 A1 | 1/2013 | Jackson et al. | |
| 2013/0014157 A1 | 1/2013 | Harville | |
| 2013/0113996 A1 | 5/2013 | Zhu et al. | |
| 2013/0339998 A1 | 12/2013 | Arme et al. | |
| 2014/0063259 A1 | 3/2014 | Rhodus et al. | |
| 2014/0156364 A1 | 6/2014 | Zalewski | |
| 2014/0282670 A1 | 9/2014 | Sinha et al. | |
| 2014/0359656 A1 | 12/2014 | Banica et al. | |
| 2014/0373044 A1* | 12/2014 | Carrol | H04H 60/06 725/32 |
| 2015/0074535 A1 | 3/2015 | Silberstein et al. | |
| 2015/0139613 A1 | 5/2015 | Mondelore et al. | |
| 2015/0155008 A1 | 6/2015 | Herberger et al. | |
| 2015/0234564 A1 | 8/2015 | Snibbe et al. | |
| 2015/0237415 A1 | 8/2015 | Hundemer | |
| 2015/0264295 A1 | 9/2015 | Hundemer | |
| 2015/0356774 A1 | 12/2015 | Gal et al. | |
| 2016/0316240 A1 | 10/2016 | Hirsch et al. | |
| 2018/0192119 A1 | 7/2018 | Stigall et al. | |
| 2019/0098362 A1 | 3/2019 | Gutman | |

OTHER PUBLICATIONS

Office Action dated Feb. 21, 2018, of U.S. Appl. No. 14/864,117, filed Sep. 24, 2015.
U.S. Appl. No. 14/864,117, filed Sep. 24, 2015.
U.S. Appl. No. 14/864,636, filed Sep. 24, 2015.
U.S. Appl. No. 14/864,646, filed Sep. 24, 2015.
U.S. Appl. No. 14/864,651, filed Sep. 24, 2015.
Non-final office action dated Jul. 26, 2016 of U.S. Appl. No. 14/864,117, filed Sep. 24, 2015.
Non-Final Office Action dated Oct. 27, 2016, of U.S. Appl. No. 14/864,646, filed Sep. 24, 2015.
International Search Report dated Oct. 11, 2016 issued in connection with International Application No. PCT/US2016/040622, filed on Jul. 1, 2016, 5 pages.
Written Opinion of the International Searching Authority dated Oct. 11, 2016 issued in connection with International Application No. PCT/US2016/040622, filed on Jul. 1, 2016, 9 pages.
International Search Report dated Oct. 7, 2016 issued in connection with International Application No. PCT/US2016/040623, filed on Jul. 1, 2016, 3 pages.
Written Opinion of the International Searching Authority dated Oct. 7, 2016 issued in connection with International Application No. PCT/US2016/040623, filed on Jul. 1, 2016, 6 pages.
International Search Report dated Sep. 12, 2016 issued in connection with International Application No. PCT/US2016/040624, filed Jul. 1, 2016, 3 pages.
Written Opinion of the International Searching Authority dated Sep. 12, 2016 issued in connection with International Application No. PCT/US2016/040624, filed on Jul. 1, 2016, 8 pages.
Non-Final Office Action dated Nov. 16, 2016, of U.S. Appl. No. 14/864,651, filed Sep. 24, 2015.
Final Office Action dated Feb. 22, 2017, of U.S. Appl. No. 14/864,646, filed Sep. 24, 2015.
Final Office Action dated Mar. 7, 2017, of U.S. Appl. No. 14/864,117, filed Sep. 24, 2015.
Non-Final Office Action dated Jun. 5, 2017, of U.S. Appl. No. 14/864,636, filed Sep. 24, 2015.
Advisory Action dated Jul. 5, 2017, of U.S. Appl. No. 14/864,646, filed Sep. 24, 2015.
Final Office Action dated Jul. 26, 2017, of U.S. Appl. No. 14/864,651, filed Sep. 24, 2015.
Final Office Action dated Sep. 5, 2018, of U.S. Appl. No. 14/864,651, filed Sep. 24, 2015.
Office Action dated Nov. 14, 2018, of U.S. Appl. No. 14/864,117, filed Sep. 24, 2015.
Advisory Action dated May 15, 2018, of U.S. Appl. No. 14/864,636 filed Sep. 24, 2015.
Office Action dated Dec. 21, 2018, of U.S. Appl. No. 14/864,636, filed Sep. 24, 2015.
Notice of Allowance dated Sep. 25, 2019, of U.S. Appl. No. 14/864,117, filed Sep. 24, 2015.
Office Action dated Jun. 5, 2019, of U.S. Appl. No. 14/864,651, filed Sep. 24, 2015.
Final Office Action dated Aug. 26, 2019, of U.S. Appl. No. 14/864,636, filed Sep. 24, 2015.

* cited by examiner

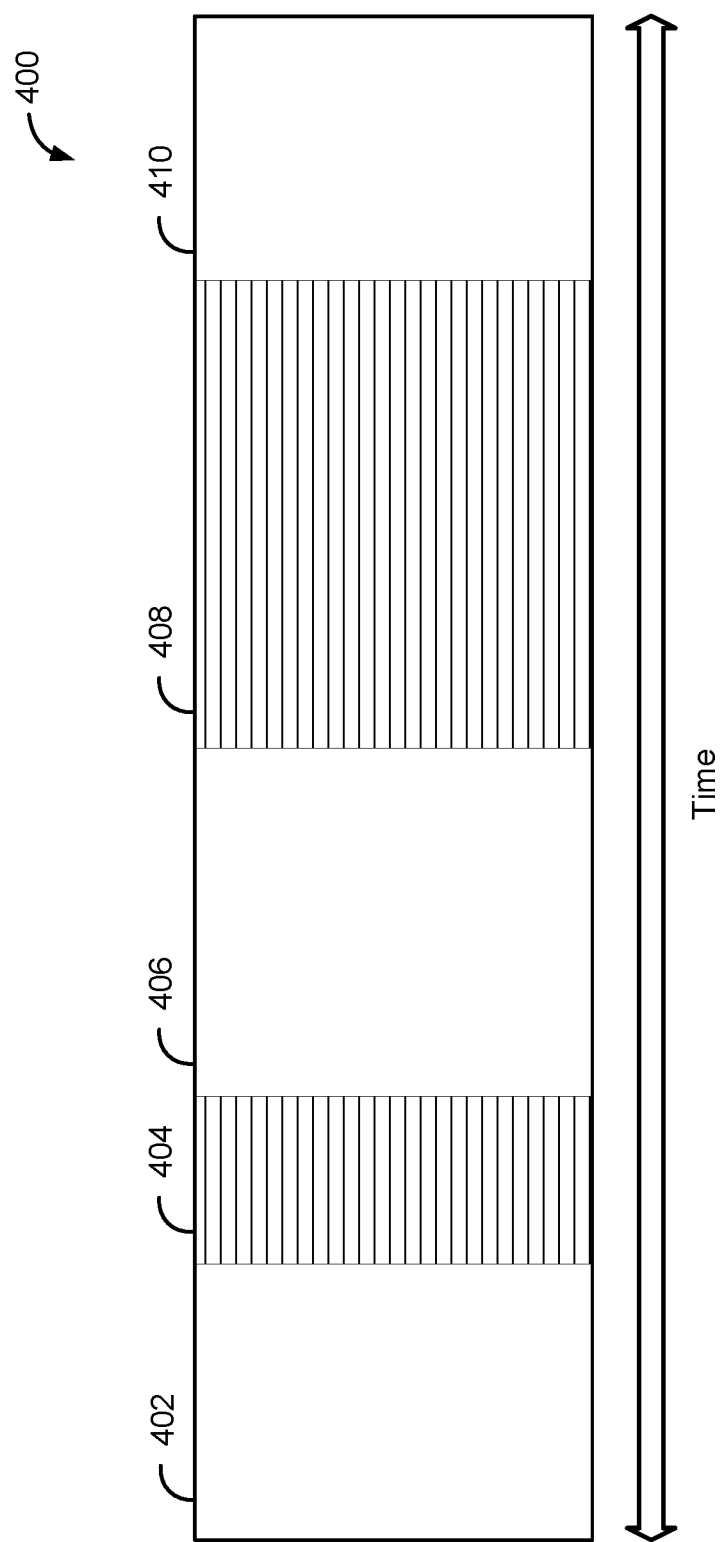

VIDEO-BROADCAST SYSTEM WITH DVE-RELATED ALERT FEATURE

PRIORITY

This disclosure is a continuation of, and claims priority to, U.S. patent application Ser. No. 14/864,641 filed Sep. 24, 2015, which is hereby incorporated by reference herein in its entirety.

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

A video-broadcast system may be configured to generate and broadcast a video stream to a set of receivers (e.g., set-top boxes) for viewing by end-users. The system may include multiple components for generating the video stream. For example, the system may include a digital video-effect (DVE) system, which may apply a DVE to a video segment represented by a video stream. This may result in the DVE system modifying the video segment and generating a new video stream that represents the modified video segment.

SUMMARY

In a first aspect, a video-broadcast system includes an automation system; a communication network; and a DVE system connected to the automation system via the communication network, wherein the automation system is configured for performing a set of acts including: (i) receiving an instruction to apply a particular DVE of a particular DVE type to a temporal portion of a video segment based, at least in part, on the temporal portion of the video segment being suitable for having a DVE of the particular DVE type applied thereto, wherein the particular DVE corresponds to a duration; (ii) making a determination that no particular temporal portion of the video segment satisfies each condition in a condition set, wherein the condition set comprises (a) a first condition that the particular temporal portion of the video segment has been identified as being suitable for having a DVE of the particular DVE type applied thereto, and (b) a second condition that the particular temporal portion of the video segment is of at least the duration; and (iii) based, at least in part, on the received instruction and the determination, outputting an alert.

In a second aspect, an example method for use in a video-broadcast system having a DVE system is disclosed. The method includes: (i) receiving an instruction to apply a particular DVE of a particular DVE type to a temporal portion of a video segment based, at least in part, on the temporal portion of the video segment being suitable for having a DVE of the particular DVE type applied thereto, wherein the particular DVE corresponds to a duration; (ii) making a determination that no particular temporal portion of the video segment satisfies each condition in a condition set, wherein the condition set comprises (a) a first condition that the particular temporal portion of the video segment has been identified as being suitable for having a DVE of the particular DVE type applied thereto, and (b) a second condition that the particular temporal portion of the video segment is of at least the duration; and (iii) based, at least in part, on the received instruction and the determination, outputting an alert.

In a third aspect, a non-transitory computer-readable medium has stored thereon program instructions that when executed cause performance of a set of acts including: (i) receiving an instruction to apply a particular DVE of a particular DVE type to a temporal portion of a video segment based, at least in part, on the temporal portion of the video segment being suitable for having a DVE of the particular DVE type applied thereto, wherein the particular DVE corresponds to a duration; (ii) making a determination that no particular temporal portion of the video segment satisfies each condition in a condition set, wherein the condition set comprises (a) a first condition that the particular temporal portion of the video segment has been identified as being suitable for having a DVE of the particular DVE type applied thereto, and (b) a second condition that the particular temporal portion of the video segment is of at least the duration; and (iii) based, at least in part, on the received instruction and the determination, outputting an alert.

BRIEF DESCRIPTION OF THE DRAWINGS

FIG. 4 is a simplified diagram illustrating a timeline representation of an example video segment.

DETAILED DESCRIPTION

I. Overview

Figure 1:
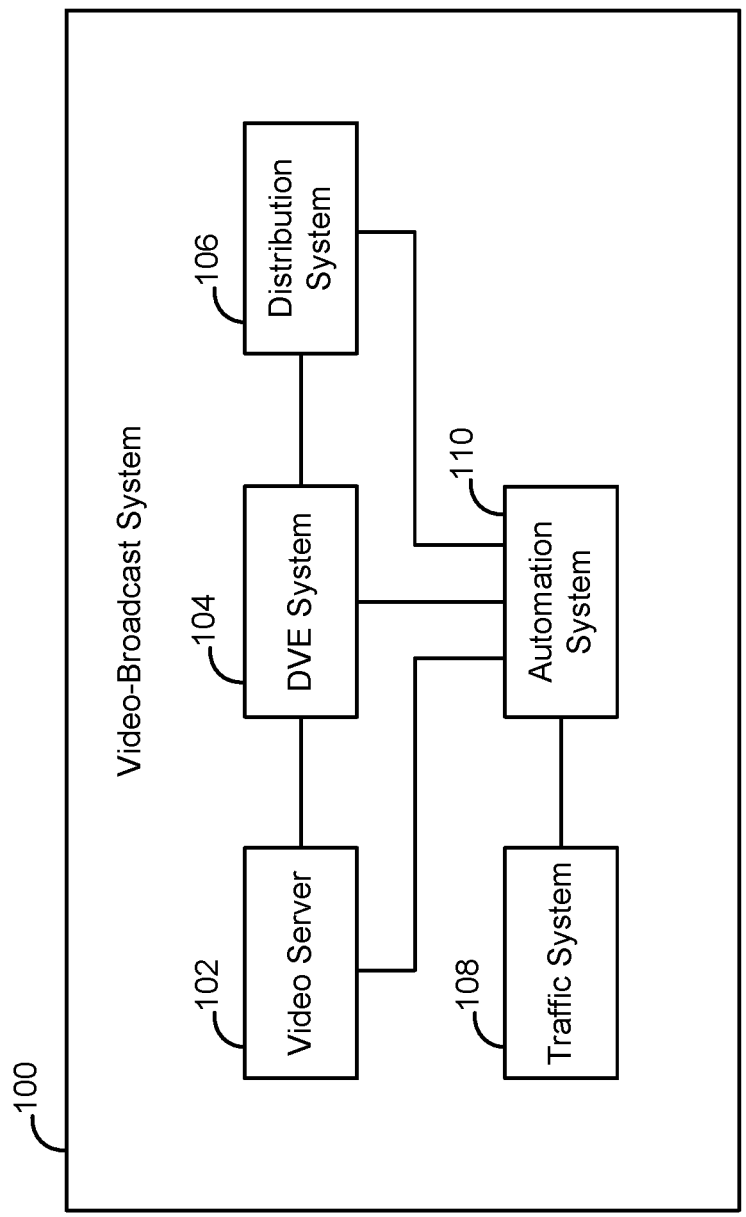
FIG. 1 is a simplified block diagram illustrating an example system.

The following detailed description describes various features, acts and/or functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

As indicated above, a DVE system may apply a DVE to a video segment. There are various types of DVEs, one example of which is an overlay DVE. An overlay DVE is a DVE in which content (e.g., in the form of text, image, and/or video content) is overlaid on a region of video content. There are also various types of overlay DVEs. For instance, in connection with one type of overlay DVE, a channel or station logo may be overlaid on a bottom-right-corner region of video content. In this instance, the logo may be semi-transparent so that it does not become a focal point for a viewer. In another instance, in connection with another type of overlay DVE, an advertisement for a show scheduled to be broadcast at a later time, may be overlaid on a bottom-left-corner region of video content.

In some instances, an applied overlay DVE may cause an undesirable experience for a viewer. For instance, where a video segment includes text (e.g., opening credits of a show) in a bottom region, and where an overlay DVE is of the type where video content is overlaid on a bottom region of video content, applying the overlay DVE to the temporal portion of the video segment may result in the video content and the text becoming jumbled, which may be distracting to a viewer. The present disclosure provides a way to help facilitate the application of an overlay DVE while reducing that chance of causing an undesirable experience for a viewer.

According to the present disclosure, an example method includes an automation system receiving an instruction to apply a first particular DVE of a particular DVE type to a temporal portion of a video segment, based, at least in part, on the temporal portion of the video segment being suitable for having a DVE of the particular DVE type applied thereto, wherein the particular DVE corresponds to a duration. In one example, the act of receiving the instruction may include receiving a portion of a traffic schedule associated with a video-broadcast system, and extracting the instruction from the received portion of the traffic schedule.

Further, the method may include the automation system making a determination that no particular temporal portion of the video segment satisfies each condition in a condition set. The condition set may include a first condition that the particular temporal portion of the video segment has been identified as being suitable for having a DVE of the particular DVE type applied thereto and a second condition that the particular temporal portion of the video segment is of at least the duration.

In this instance, given that no temporal portion of the video segment satisfies these conditions, the automation system may not apply the particular DVE to a temporal portion of the video segment. Further the method may include, based, at least in part, on the received instruction and the determination, outputting an alert. This may alert a user to the fact that the automation system did not apply the particular DVE to a temporal portion of the video segment as specified in the instruction. This may allow the user to modify the instruction, edit the video segment, and/or take another action to ensure that the particular DVE (or some modified version thereof) gets applied to a temporal portion of the video segment. In one example, the act of outputting the alert may include transmitting an instruction configured to cause a record associated with the received instructions to be added to a list. Further, the method may include displaying the list on a display device. This may allow the user to view a list of instructions that are causing potential issues.

II. Example System

FIG. 1 is a simplified block diagram illustrating an example video-broadcast system 100. The video-broadcast system 100 may take a variety of forms, such as that of a television-broadcast system. The video-broadcast system 100 may include a video server 102, a DVE system 104, a distribution system 106, a traffic system 108, and an automation system 110.

The systems and devices of the video-broadcast system 100 may be connected in various ways. For example, the DVE system 104 may be connected to the video server 102 and the distribution system 106. And the automation system 110 may be connected to the video server 102, the DVE system 104, the distribution system 106, and the traffic system 108.

Each connection described in this disclosure may be a direct connection or an indirect connection, the latter being a connection that passes through or traverses one or more devices, such as a router, switcher, or other network device.

The video server 102 may be configured to load a video asset. This may involve the video server 102 retrieving from a data storage unit a file representing the video asset. The video server 102 may also be configured to playout the video asset. This may involve the video server 102 converting a retrieved file into a video stream and outputting the video stream. In one example, the video server 102 may transmit the video stream to the DVE system 104.

The DVE system 104 may be configured to perform various functions related to DVEs. For example, the DVE system 104 may be configured to receive a video stream representing a video segment and apply a DVE to the video segment. This may result in the DVE system 104 modifying the video segment and generating a new video stream that represents the modified video segment. The DVE system 104 may further be configured for outputting the generated video stream. In one example, the DVE system 104 may transmit the generated video stream to the distribution system 106.

The DVE system 104 may take various forms, such as that of a stunt switcher. An example of a stunt switcher is the Miranda NVISION NVS5100MC provided by NVision, Inc. of Coppell, Tex.

There are various types of DVEs, one example of which is an overlay DVE. An overlay DVE is a DVE in which content (e.g., in the form of text, image, and/or video content) is overlaid on a region of video content. There are also various types of overlay DVEs. For instance, in connection with one type of overlay DVE, a channel or station logo may be overlaid on a bottom-right-corner region of video content. In this instance, the logo may be semi-transparent so that it does not become a focal point for a viewer. In another instance, in connection with another type of overlay DVE, an advertisement for a show scheduled to be broadcast at a later time, may be overlaid on a bottom-left-corner region of video content.

The DVE system 104 may also be configured to assist a user in designing a DVE. For example, a user may design an overlay DVE by specifying what the overlaying content should be, and where on video content should the overlaying content be overlaid. While or after a DVE is designed, the DVE system 104 may generate and store a corresponding set of instructions into a data storage unit.

To apply the DVE to video content, the DVE system 104 may then retrieve and execute the corresponding set of instructions. In one example, this may cause the DVE system 104 to use one or more layers known as "keys" to modify the video content such that the DVE system 104 can generate a video stream representing the modified video content.

In some instances, an overlay DVE may have a specified duration. In such cases, the DVE system 104 may automatically stop applying the overlay DVE after the specified duration has lapsed.

Another example type of DVE is a removal DVE. A removal DVE may be configured to remove an overlay DVE from video content. In one example, the removal DVE may simply "reset" all keys such that no overlaying content or other effects remain, thereby ensuring that any overlay DVE is removed from the video content. In some instances, an overlay DVE may not have a specified duration. In such cases, the DVE system 104 may apply a removal DVE at a desired time to stop the overlay DVE from being applied.

In some instances, the DVE system 104 may also store in a data storage unit content intended to be used in connection with an overlay DVE (e.g., a channel or station logo). In other instances, the DVE system 104 may receive such content (e.g., from the video server 102) as the DVE is being applied.

As used throughout this disclosure, the term broadcast means the distribution of media (e.g., audio, video, or a combination thereof) via any means. As such, the distribution system 106 may be configured to distribute a video stream to an end-user device via any means for presentation to an end-user. In practice, the distribution system 106 may distribute a video stream to a mass number of end-user devices for presentation to a mass number of end-users. The distribution system 106 may include various systems or components, such as a terrestrial antenna or a satellite, and may be configured for distributing the video stream to the end-user device in a variety of ways. For example, the distribution system 106 may distribute the video stream over-the-air or via a packet-based network such as the Internet. The end-user device may take a variety of forms, such as that of a television, a television set-top box, or a computing device. The traffic system 108 may be configured to perform operations related to broadcast scheduling. For example, the traffic system 108 may be configured to facilitate the creation and modification of a traffic schedule, and to output the traffic schedule. A traffic schedule is a schedule of broadcast-related events, typically for a particular channel or station. A traffic schedule is sometimes referred to in the broadcast industry as a traffic log. An example of the traffic system 108 is Wide Orbit Traffic provided by Wide Orbit Inc. of San Francisco, Calif. In one example, the traffic system 108 may transmit a traffic schedule to the automation system 110.

The automation system 110 may be configured to perform operations related to broadcast scheduling and sequencing. For example, the automation system 110 may be configured to receive a traffic schedule from the traffic system 108, and to modify the traffic schedule, such as by adding information to it. For example, where a record of the traffic schedule indicates that a particular video segment has been scheduled, the automation system 110 may add to that record an indication of a particular video server assigned to load and playout that video segment. In practice, the automation system 110 may modify multiple records of the traffic schedule in this manner. A traffic schedule that has been modified with this additional information is sometimes referred to in the broadcast industry as a playlist.

The automation system 110 may also be configured to control one or more systems or devices. In one example, the automation system 110 may traverse records of a traffic schedule, and control systems or devices based on the entries in those traversed records. The automation system 110 may control a system or device in various ways, such as by transmitting a suitable instruction to the system or device.

In some examples, the video-broadcast system 100 may be integrated with an audio-broadcast system, such that a video stream representing video content may be broadcast together with an audio stream representing corresponding audio content. In some instances, the video stream and the audio stream may be combined into a single media stream.

Figure 2:
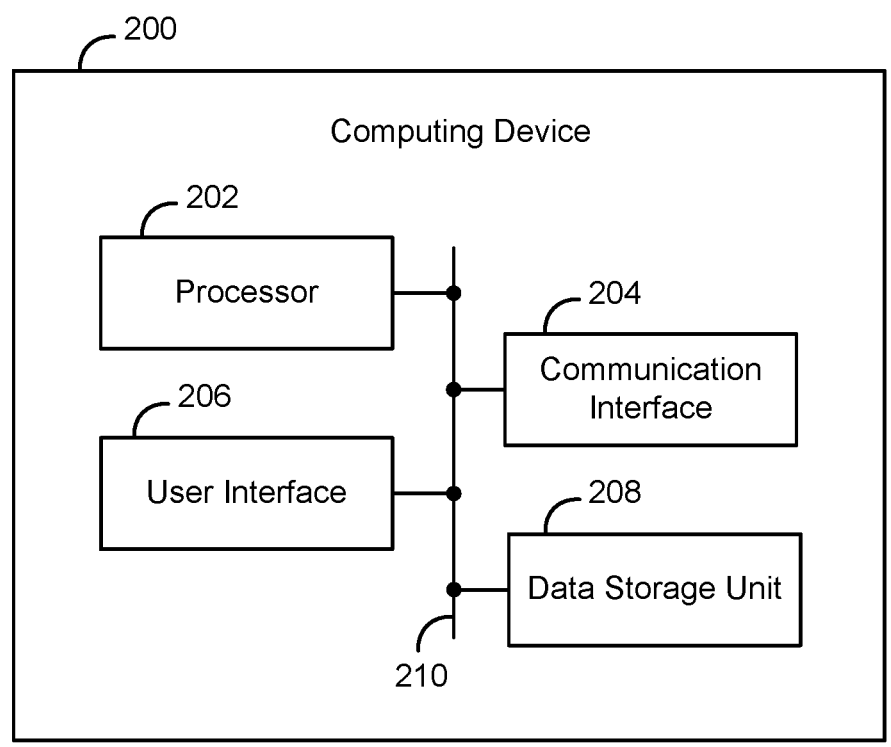
FIG. 2 is a simplified block diagram illustrating an example computing device.

FIG. 2 is a simplified block diagram illustrating an example computing device 200. The device 200 may be configured for performing a variety of functions or acts, such as those described in this disclosure (including the accompanying drawings). The device 200 may include various components, including for example, a processor 202, a communication interface 204, a user interface 206, and a data storage unit 208. The components of the device 200 may be communicatively connected to each other (or other devices or systems) via a system bus, network, or other connection mechanism 210.

The processor 202 may include a general purpose processor (e.g., a microprocessor) and/or a special purpose processor (e.g., a digital signal processor (DSP)).

The communication interface 204 may be configured to allow the device 200 to communicate with one or more devices or systems according to one or more protocols. In one example, the communication interface 204 may be a wired interface, such as an Ethernet interface or a high-definition serial-digital-interface (HD-SDI). As another example, the communication interface 204 may be a wireless interface, such as a cellular or WI-FI interface.

The user interface 206 may facilitate interaction with a user of the device, if applicable. As such, the user interface 206 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. In one example, the device 200 may receive, via the user interface 206, input that may be used to design a DVE.

The data storage unit 208 may include one or more volatile, non-volatile, removable, and/or non-removable storage components, such as magnetic, optical, or flash storage, and may be integrated in whole or in part with the processor 202. Further, the data storage unit 208 may take the form of a non-transitory computer-readable storage medium, having stored thereon program instructions (e.g., compiled or non-compiled program logic and/or machine code) that, when executed by the processor 202, cause the device 200 to perform one or more functions or acts, such as those described in this disclosure. Such program instructions may define or be part of a discrete software application that can be executed in response to certain input received via user interface 206, for instance. The data storage unit 208 may also store other types of information or data, such as those types described throughout this disclosure.

III. Example Operations

Figure 3:
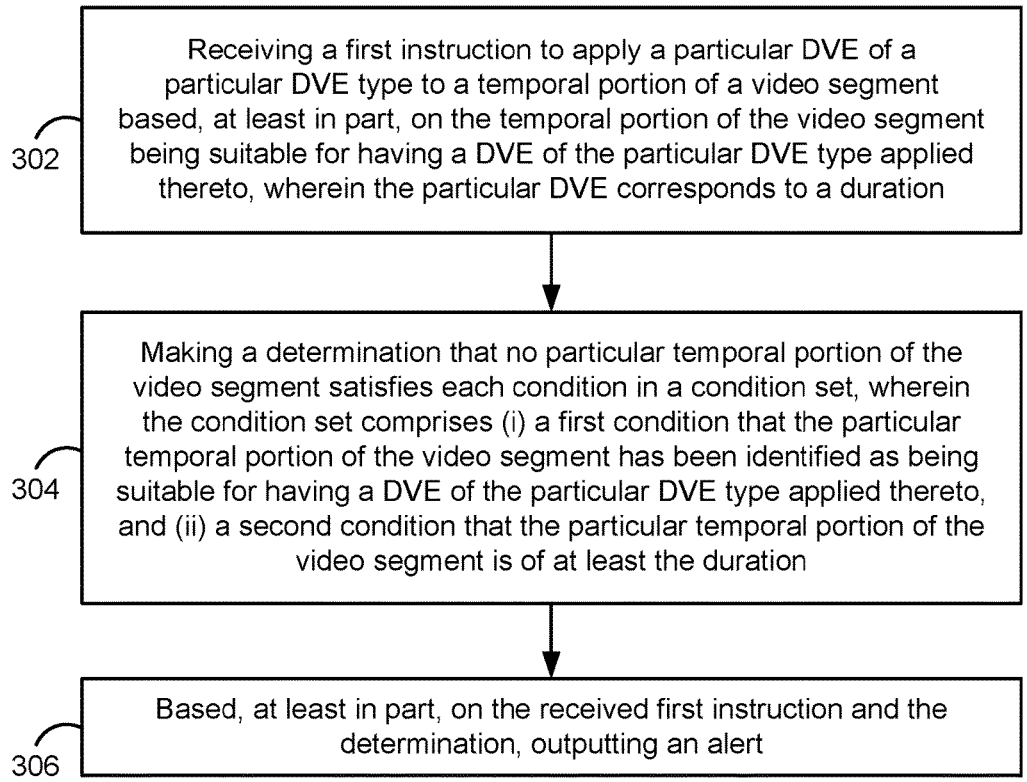
FIG. 3 is a flow chart illustrating an example method.

FIG. 3 is a flow chart illustrating an example method 300. The method 300 may be used in connection with a system including an automation system, a communication network, and a DVE system. In one example, the method 300 may be used in connection with the system 100.

At block 302, the method may include receiving a first instruction to apply a particular DVE of a particular DVE type to a temporal portion of a video segment based, at least in part, on the temporal portion of the video segment being suitable for having a DVE of the particular DVE type applied thereto, wherein the particular DVE corresponds to a duration. For instance, the method may include the automation system 110 receiving the first instruction. In one example, this may include the automation system 110 receiving a portion of a traffic schedule from the traffic system 108, and extracting the first instruction from the received portion of the traffic schedule.

The particular DVE of the particular DVE type may refer to a DVE where a particular type of content is overlaid and/or where content is overlaid on a particular region of video content. As such, in one example, the particular DVE of the particular DVE type may refer to a particular overlay DVE where content is overlaid on a bottom region of video content.

The particular DVE may include another type of DVE as well. For example, the particular DVE may include what is commonly referred to in the industry as a pull-back DVE, which causes one portion of video content to be "pulled back" and displayed in a first window of a reduced size, while another portion of video content is displayed in a second window, perhaps that is the same size as the first window. Pull-back DVEs are commonly used to facilitate the transition of one media program to another. By using these dual windows, both media programs can be broadcast together in an overlapping manner for a specified duration (e.g., 10 seconds).

At block 304, the method may include making a determination that no particular temporal portion of the video segment satisfies each condition in a condition set, wherein the condition set comprises (i) a first condition that the particular temporal portion of the video segment has been identified as being suitable for having a DVE of the particular DVE type applied thereto, and (ii) a second condition that the particular temporal portion of the video segment is of at least the duration.

In one scenario, via a user interface of a computing device, a user may watch or scan through a video segment, and mark one or more temporal portions of the video segment that the user identifies as being suitable for having a DVE of the particular overlay-DVE type (or another type) applied thereto. The user may identify such temporal portions based on the temporal portions of the video segment having a particular characteristic. For example, the user may identify such temporal portions based on a bottom region of the temporal portions of the video segment lacking text or other content that may interfere with content that may be overlaid thereon. In another scenario, the computing device may employ a suitable algorithm to automatically detect and mark one or more temporal portions of the video segment that are suitable for having a DVE of the particular overlay-DVE type (or another type) applied thereto, again perhaps based on the temporal portions of the video segment having a particular characteristic.

In either scenario, the computing device may then store data representing these markings, perhaps as video segment metadata, and the automation system 110 may retrieve and use this data to make the first determination that no particular temporal portion of the video segment satisfies each condition in the condition set.

To help illustrate the concept, consider FIG. 4, which is a simplified diagram illustrating a timeline representation of an example video segment 400. The video segment 400 may include one or more temporal portions 402, 406, and 410 that are unsuitable for having a DVE of a particular overlay-DVE type applied thereto. The video segment 400 may also include temporal portions 404 and 408 that are suitable for having a DVE of the particular overlay-DVE type applied thereto, and which have been identified as such.

In this instance, temporal portions 404 and 408 may satisfy the first condition, but not the second condition (i.e., the temporal portions 404 and 408 may not have a long enough duration).

At block 306, the method may include based, at least in part, on the received first instruction and the determination, outputting an alert.

In one scenario, the act of outputting the alert may include outputting an audible or visual alert, or transmitting a second instruction. The second instruction may be configured to cause a record associated with the received instruction to be added to a list, such as a work queue. Still further, the method may include, outputting the list such as by displaying the list on a display device. The record may include, for instance, a data retrieved from a portion of the traffic schedule from which the first instruction was extracted.

By adding such data to the list, the user may view a list of instructions and/or related data that are causing potential issues. By viewing this list, a user may use the automation system 110 to modify the first instruction, modify the video segment, and/or take another action to resolve the potential issue (i.e., to ensure that the particular DVE, or a modified version thereof, can be applied to a particular temporal portion of the video segment, as desired).

Referring back to the act at block 302, in some examples, the received instruction may provide additional details relating to the manner in which the particular DVE should be applied to a suitable temporal portion of the video segment. For example, receiving the instruction may include receiving an instruction to apply the particular DVE to the temporal portion of the video segment based, at least in part, on (i) the temporal portion of the video segment being suitable for having the particular DVE applied thereto, (ii) the temporal portion of the video segment having at least the duration, and (iii) a start time of the temporal portion of the video segment being within a threshold time period of a start time of the video segment.

Depending on the nature of the received instruction, the automation system 110 may perform additional acts and/or the act at block 304 may vary, as appropriate. For example, where the received instruction relates to the third condition as noted above, the automation system 110 may determine whether a temporal portion satisfies each condition in a condition set. In this case, the determination may be made based on no temporal portion of the video segment satisfying the first condition, the second condition, and a third condition that a start time of the particular temporal portion of the video segment is within the threshold time period of the start time of the video segment.

IV. Example Variations

While one or more acts have been described as being performed by certain devices, systems, or entities (e.g., the automation system 110), the acts may be performed by any device, system, or entity, such as those described in connection with the video-broadcast system 100. For example, in some instances, the described acts may be performed by a television, set-top box, or other device, system or entity at the viewer's end, rather than by one or more components of a video-broadcast system. Furthermore, the devices and systems need not be discrete entities. Some or all of the devices or systems may be combined into a single device or system, or otherwise arranged.

In addition, the acts described herein need not be performed in the disclosed order, although in some examples an order may be preferred. Also, not all acts need to be performed to achieve the desired advantages of the disclosed systems, devices, and methods, and therefore not all acts are required. Variations discussed in connection with one example may be applied to all other examples disclosed herein.

While select examples of the present disclosure have been described, alterations and permutations of these examples will be apparent to those of ordinary skill in the art. Other changes, substitutions, and alterations are also possible without departing from the broader aspects of the invention as set forth in the following claims.

The invention claimed is:

1. A video-broadcast system comprising:
   an automation system;
   a communication network; and
   a digital video-effect (DVE) system connected to the automation system via the communication network, wherein the automation system is configured for performing a set of acts comprising:
      receiving an instruction to apply a particular DVE of a particular DVE type to a temporal portion of a video segment based, at least in part, on the temporal portion of the video segment being suitable for having a DVE of the particular DVE type applied thereto, wherein the particular DVE corresponds to a duration, wherein receiving the instruction comprises extracting the instruction from a portion of a traffic schedule;
      making a determination that no particular temporal portion of the video segment satisfies each condition in a condition set, wherein the condition set comprises (i) a first condition that the particular temporal portion of the video segment has been identified as being suitable for having a DVE of the particular DVE type applied thereto, and (ii) a second condition that the particular temporal portion of the video segment is of at least the duration; and
      based, at least in part, on the received instruction and the determination, outputting an alert.

2. The video-broadcast system of claim 1, wherein receiving the instruction comprises receiving an instruction to apply the particular DVE to the temporal portion of the video segment based, at least in part, on (i) the temporal portion of the video segment being suitable for having the particular DVE applied thereto, (ii) the temporal portion of the video segment is of at least the duration, and (iii) a start time of the temporal portion of the video segment being within a threshold time period of a start time of the video segment.

3. The video-broadcast system of claim 1, wherein the condition set comprises a third condition that a start time of the particular temporal portion of the video segment is within the threshold time period of the start time of the video segment.

4. The video-broadcast system of claim 1, wherein the instruction is a first instruction, and wherein outputting the alert comprises transmitting a second instruction.

5. The video-broadcast system of claim 4, wherein the second instruction is configured to cause a record associated with the received instruction to be added to a list, wherein the set of acts further comprises outputting the list.

6. The video-broadcast system of claim 5, further comprising a display device, wherein outputting the list comprises displaying the list on the display device.

7. A method for use in a video-broadcast system having a digital video-effect (DVE) system, the method comprising:
   receiving an instruction to apply a particular DVE of a particular DVE type to a temporal portion of a video segment based, at least in part, on the temporal portion of the video segment being suitable for having a DVE of the particular DVE type applied thereto, wherein the particular DVE corresponds to a duration, wherein receiving the instruction comprises extracting the instruction from a portion of a traffic schedule;
   making a determination that no particular temporal portion of the video segment satisfies each condition in a condition set, wherein the condition set comprises (i) a first condition that the particular temporal portion of the video segment has been identified as being suitable for having a DVE of the particular DVE type applied thereto, and (ii) a second condition that the particular temporal portion of the video segment is of at least the duration; and
   based, at least in part, on the received instruction and the determination, outputting an alert.

8. The method of claim 7, wherein receiving the instruction comprises receiving an instruction to apply the particular DVE to the temporal portion of the video segment based, at least in part, on (i) the temporal portion of the video segment being suitable for having the particular DVE applied thereto, (ii) the temporal portion of the video segment having at least the duration, and (iii) a start time of the temporal portion of the video segment being within a threshold time period of a start time of the video segment.

9. The method of claim 7, wherein the condition set comprises a third condition that a start time of the particular temporal portion of the video segment is within the threshold time period of the start time of the video segment.

10. The method of claim 7, wherein the instruction is a first instruction, and wherein outputting the alert comprises transmitting a second instruction.

11. The method of claim 10, wherein the second instruction is configured to cause a record associated with the received instruction to be added to a list, wherein the method further comprises outputting the list.

12. The method of claim 11, wherein outputting the list comprises displaying the list on a display device.

13. A non-transitory computer-readable medium having stored thereon program instructions that when executed cause performance of a set of acts comprising:
   receiving an instruction to apply a particular DVE of a particular DVE type to a temporal portion of a video segment based, at least in part, on the temporal portion of the video segment being suitable for having a DVE of the particular DVE type applied thereto, wherein the particular DVE corresponds to a duration, wherein receiving the instruction comprises extracting the instruction from a portion of a traffic schedule;
   making a determination that no particular temporal portion of the video segment satisfies each condition in a condition set, wherein the condition set comprises (i) a first condition that the particular temporal portion of the video segment has been identified as being suitable for having a DVE of the particular DVE type applied thereto, and (ii) a second condition that the particular temporal portion of the video segment is of at least the duration; and
   based, at least in part, on the received instruction and the determination, outputting an alert.

14. The non-transitory computer-readable medium of claim 13, wherein receiving the instruction comprises receiving an instruction to apply the particular DVE to the temporal portion of the video segment based, at least in part, on (i) the temporal portion of the video segment being suitable for having the particular DVE applied thereto, (ii) the temporal portion of the video segment is of at least the duration, and (iii) a start time of the temporal portion of the video segment being within a threshold time period of a start time of the video segment.

15. The non-transitory computer-readable medium of claim 13, wherein the condition set comprises a third condition that a start time of the particular temporal portion of the video segment is within the threshold time period of the start time of the video segment.

16. The non-transitory computer-readable medium of claim 13, wherein the instruction is a first instruction, and wherein outputting the alert comprises transmitting a second instruction.

17. The non-transitory computer-readable medium of claim 16, wherein the second instruction is configured to cause a record associated with the received instruction to be added to a list, wherein the set of acts further comprises outputting the list.

* * * * *